United States Patent
Oh et al.

(10) Patent No.: US 9,608,713 B2
(45) Date of Patent: Mar. 28, 2017

(54) APPARATUS AND METHOD FOR REMOVING INTERFERENCE BY ICS REPEATER USING STANDARDIZER

(71) Applicant: RF WINDOW CO., LTD., Uiwang-si (KR)

(72) Inventors: Yong Seok Oh, Seoul (KR); Young Cheol Jeon, Seoul (KR); Kyoung Soo Park, Seoul (KR)

(73) Assignee: RF WINDOW CO., LTD. (KR)

( * ) Notice: Subject to any disclaimer, the term of this patent is extended or adjusted under 35 U.S.C. 154(b) by 0 days.

(21) Appl. No.: 14/787,433

(22) PCT Filed: Aug. 19, 2014

(86) PCT No.: PCT/KR2014/007670
§ 371 (c)(1),
(2) Date: Oct. 27, 2015

(87) PCT Pub. No.: WO2015/026130
PCT Pub. Date: Feb. 26, 2015

(65) Prior Publication Data
US 2016/0173187 A1 Jun. 16, 2016

(30) Foreign Application Priority Data

Aug. 21, 2013 (KR) .......................... 10-2013-0099179

(51) Int. Cl.
*H04B 7/155* (2006.01)

(52) U.S. Cl.
CPC .............................. *H04B 7/15585* (2013.01)

(58) Field of Classification Search
CPC .................................................. H04B 7/15585
See application file for complete search history.

(56) References Cited

U.S. PATENT DOCUMENTS

| | | | |
|---|---|---|---|
| 2001/0050592 A1* | 12/2001 | Wright | H03F 1/3241 330/2 |
| 2003/0138039 A1* | 7/2003 | Greiss | H04B 1/0003 375/232 |
| 2009/0286473 A1* | 11/2009 | Park | H04B 7/15585 455/16 |
| 2009/0304121 A1* | 12/2009 | Pedersen | H04L 25/0212 375/341 |

FOREIGN PATENT DOCUMENTS

| | | |
|---|---|---|
| KR | 10-2008-0058870 A | 6/2008 |
| KR | 10-2008-0112829 A | 12/2008 |
| KR | 10-2010-0131146 A | 12/2010 |
| KR | 10-2013-0054305 A | 5/2013 |

* cited by examiner

*Primary Examiner* — Mohammad Anwar
(74) *Attorney, Agent, or Firm* — Weiss & Moy, P.C.; Jeffrey D. Moy

(57) ABSTRACT

The present disclosure relates to an interference cancellation method and device of an ICS repeater using a leveler, and may effectively cancel only interference signals by using a leveler without using a magnetic correlation cancellation device or digital filter in order to cancel unnecessary noise signals generated by narrow-band signals and enable an ICS repeater design for an LTE wireless network that needs a short system time delay.

8 Claims, 4 Drawing Sheets

APPARATUS AND METHOD FOR REMOVING INTERFERENCE BY ICS REPEATER USING STANDARDIZER

CROSS-REFERENCE TO RELATED APPLICATION

This application claims priority to Korean Patent Application No. 10-2013-0099179 filed on Aug. 21, 2013 and all the benefits accruing therefrom under 35 U.S.C. §119, the contents of which are incorporated by reference in their entirety.

BACKGROUND

The present disclosure relates to an interference cancellation system (ICS) repeater that may be used in a wireless network, and more particularly to, an interference cancellation device and method of an ICS repeater using a leveler that effectively cancel only interference signals by using a leveler in an ICS repeater and enable an ICS repeater design for an LTE wireless network that needs a short system delay.

In general, an interference cancellation system (ICS) refers to a system for solving oscillation issues due to feedback signals between transmission and reception antennas in a wireless repeater, and more particularly to, a wireless repeater employing features that apply interfere cancellation to a typical wireless repeater to predict a feedback signal and subtract the predicted signal from an input original input to cancel the feedback signal.

FIG. 1 is a schematic diagram of an adaptive ICS repeater that uses an interference cancellation method using a general adaptive algorithm, and an interference cancellation engine 40 is disposed between transmission and reception antennas 10 and 30 and includes a delay unit 41, a coefficient generator 42, and a finite impulse response (FIR) filter 43.

The original signal $d(n)=s(n)+y(n)$ received through the reception antenna 10 passes through a subtractor 21 and outputs an error signal $e(n)$ devoid of an interference signal.

In this case, the coefficient generator 42 of the interference cancellation engine 40 calculates the correlation between the error signal $e(n)$ devoid of the interference signal generated through the subtractor 21 and a reference signal $x(n)$ delayed for a certain time through the delay unit 41 to calculate a prediction coefficient $w(n)$.

The interference signal prediction coefficient $w(n)$ generates a in-phase predicted feedback signal $y'(n)$ by convolution with the reference signal $x(n)$ through the FIR filter 43 and the predicted feedback signal $y'(n)$ output, to the transmission antenna 30 side, a signal devoid of the interference signal by subtraction from the original signal $d(n)$ through the subtractor 21.

The adaptive ICS repeater that uses interference cancellation using such an adaptive algorithm generally uses a least mean square (LMS) or recursive least square (RLS) adaptive algorithm, which has a characteristic in that interference cancellation capability varies depending on the characteristic of an input signal source because such an adaptive algorithm uses the correlation between the error signal $e(n)$ and the reference signal $x(n)$ to predict the feedback signal and generate an in-phase feedback signal.

In particular, in a case where a narrow-band signal is input such as a subcarrier portion of a long term evolution (LTE) or multi-carrier modulation, orthogonal frequency division multiplexing (OFDM) signal, there are limitations in that the interference signal may not effectively be cancelled by the magnetic correlation characteristic of the input signal, and rather unnecessary noise signals are generated.

In order to solve these limitations, unnecessary noise signals in a signal-free band are typically cancelled by using a FA (carrier) filter or not recognized as the narrow-band signal by a channel-type design.

However, since such an FA filter or channel type is a digital filter and significantly affects a system delay, there is a limitation in that it is difficult to design a short delay (4.6875 µs) in an LTE network.

The reason why a short delay design is required in the LTE network is prevent interference between channels and a 'Cyclic Prefix' is inserted as a signal inserted into an interval section. However, if there is no signal in a guard interval section, the orthogonality of a subcarrier is broken and interference between channels occurs. In order to prevent it, a portion of a signal in the rear part of a symbol section is copied and inserted and it is referred to as 'Cyclic Prefix'.

In the LTE network, the length of the cyclic prefix is 4.6875 µs and in the case of a wireless repeater, interference between channels does not occur only when a system delay is short than or equal to 4.6875 µs.

FIG. 2 is a schematic diagram of another ICS repeater to which a magnetic correlation cancellation device according to the related art is applied, and which is disclosed in Korean Patent Publication No. 10-2013-0054305 (Interference cancellation method of ICS repeater).

The related art is to cancel magnetic correlation to solve a limitation in inputting a narrow-band signal, the method of cancelling the magnetic correlation cancels narrow-band signals among feedback signals and leaves only wide-band white noise components to use the white noise component as the reference signal $x(n)$, and since the narrow-band signal is cancelled from the reference signal $x(n)$ and only the white noise remains, a level of a signal is weak and so there is a limitation in that an adaptive speed at which the prediction coefficient $w(n)$ is calculated gets slow.

PATENT LITERATURE

Korean Patent Publication No. 10-2013-0054305 (published on May 24, 2013)

SUMMARY

The present disclosure provides an interference cancellation method and device of an ICS repeater using a leveler that effectively cancel only interference signals by using a leveler without using a magnetic correlation cancellation device or digital filter in order to cancel unnecessary noise signals generated by narrow-band signals and enable an ICS repeater design for an LTE wireless network that needs a short system time delay.

In one embodiment, an interference cancellation device of an ICS repeater using a leveler that is disposed between a reception antenna and a transmission antenna for a wireless network repeater, subtracts a predicted feedback signal $y'(n)$ from an ICS engine from an original signal $d(n)$ input through the reception antenna, and outputs an error signal $e(n)$ devoid of an interference signal to the transmission antenna side includes a time delay unit configured to delay an error signal $e(n)$ output through the subtractor for a certain time to generate a reference signal $x(n)$; a leveler configured to level a characteristic of a narrowband signal from the reference signal $x(n)$ output from the time delay unit to generate a new reference signal $x'(n)$; a coefficient generator configured to calculate correlation between the new reference signal x'(n) output from the leveler and the error signal e(n) to calculate an interference signal prediction coefficient w(n); and a finite impulse response (FIR) filter configured to generate a predicted feedback signal y'(n) by convolution of the reference signal x(n) from the time delay unit and the prediction coefficient w(n) from the coefficient generator to input the generated signal to the subtractor.

The leveler may be configured to: convert time axis data into frequency axis data through fast fourier transform (FFT) of the input reference signal x(n), calculate a size value magnitude(A) from a complex number a+bj expressed by a magnitude and phase of a frequency by the FFT, calculate a ratio X of the size value magnitude(A) and a desired maximum size Magnitidude(MAX) to be leveled, and multiply (a*X), (b*X) the calculated X by the 'a' and the 'b' of the complex number a+bj to perform leveling, and restore the leveled data to time axis data through inverse FFT(IFFT) to calculate the new reference signal x'(n).

In another embodiment, an interference cancellation method of an ICS repeater using a leveler that generates a reference signal x(n) by delaying, through a time delay unit, an error signal e(n) devoid of interference for a certain time between a transmission antenna and a reception antenna and levels the reference signal through the leveler to cancel an interference signal generated by a narrowband input signal source includes leveling, through a leveler, a characteristic of a narrowband signal from a reference signal x(n) generated from a time delay unit to generate a new reference signal x'(n); calculating correlation between the new reference signal x'(n) through the leveler and an error signal e(n) through a subtractor to calculate an interference signal prediction coefficient w(n); and generating a predicted feedback signal y'(n) from flip reference signal x(n) and the prediction coefficient w(n); and subtracting the predicted feedback signal y'(n) by the subtractor to output an error signal e(n+1) devoid of an interference signal.

The leveling may include converting, by the leveler, time axis data into frequency axis data through FFT of the input reference signal x(n), calculating a size value magnitude(A) from a complex number a+bj expressed by a magnitude and phase of a frequency by the FFT; calculating a ratio X of the size value magnitude(A) and a desired maximum size Magnitidude(MAX) to be leveled; multiplying (a*X), (b*X) the calculated X by the 'a' and the 'b' of the complex number to perform leveling; and restoring the leveled data to time axis data through IFFT to calculate the new reference signal x'(n).

The size value magnitude(A) may be calculated by the following Equation:

$$\text{magnitude}(A) = \sqrt{a^2+b^2}.$$

The ratio X may be calculated by the following Equations:

$$\text{Magnitude}(MAX) = \text{Magnitude}(A) \times X$$

$$X = \frac{\text{Magnitude}(MAX)}{\text{Magnitude}(A)}.$$

The interference signal prediction coefficient w(n) may be performed by a coefficient generator that performs an adaptive algorithm.

The generating of the predicted feedback signal y'(n) may be performed by an FIR filter that generates the predicted feedback signal y'(n) by convolution of the reference signal x(n) and the prediction coefficient w(n).

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

The configuration and action of an interference cancellation method and device of an ICS repeater using a leveler according to the present disclosure are described in detail with reference to FIGS. 3 to 5.

Figure 1:
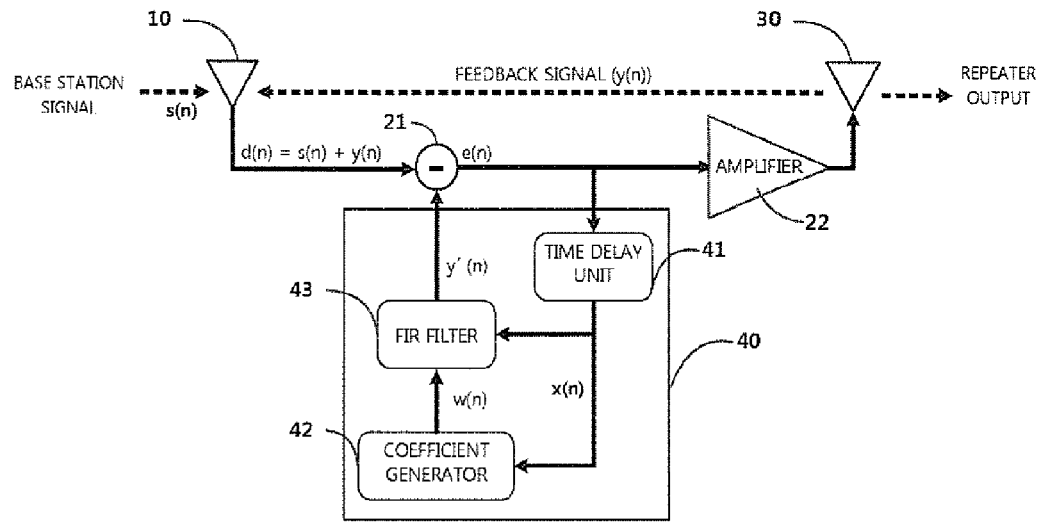
FIG. 1 is a schematic diagram of a general ICS repeater.
Figure 2:
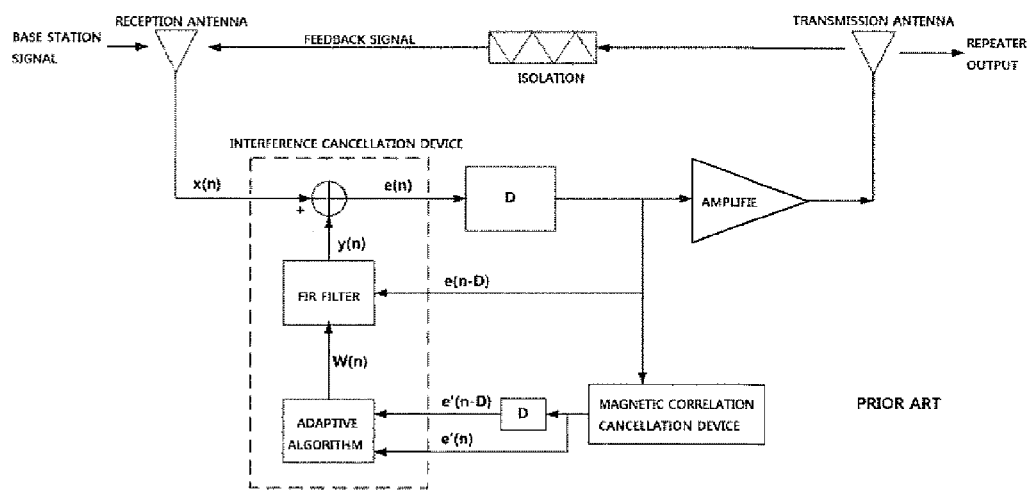
FIG. 2 is a schematic diagram of an interference cancellation system (ICS) repeater for interference cancellation according to the related art.
Figure 3:
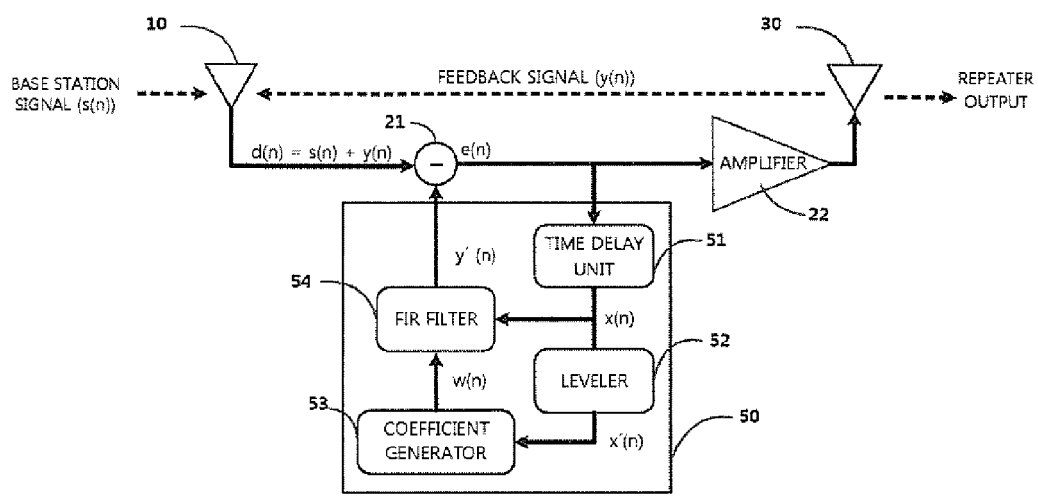
FIG. 3 is a schematic diagram of an interference cancellation device of an ICS repeater using a leveler according to an embodiment of the present disclosure.

FIG. 3 is a schematic diagram of an interference cancellation device of an interference cancellation system (ICS) repeater according to an embodiment of the present disclosure and includes a reception antenna 10 for a wireless network repeater, a subtractor 21 that subtracts a prediction signal y'(n) from the original signal d(n)=s(n)+y(n) including a base station signal s(n) input through the reception antenna 10 and a feedback signal y(n) to generate an error signal e(n+1) for cancelling an interference signal, an ICS engine 50 that generates the predicted feedback y'(n) devoid of the interference signal from the error signal e(n) output from the subtractor 21 to feed it back to the subtractor 21, and an amplifier 22 that amplifies error signals e(n), e(n+1), ... output through the subtractor 21 and then outputs the amplified signals to a transmission antenna 30.

The ICS engine 50 includes a time delay unit 51 that generates a reference signal x(n) obtained by delaying the error signal e(n) output through the subtractor 21 for a certain time, a leveler 52 that levels the characteristic of narrowband signals from the reference signal x(n) output from the time delay unit 51 to generate a new reference signal x'(n), a coefficient generator 53 that calculates the correlation between the new reference signal x'(n) output from the leveler 52 and the error signal e(n) to calculate an interference signal prediction coefficient w(n), and a finite impulse response (FIR) filter 54 that generates the predicted feedback signal y'(n) by convolution of the reference signal x(n) of the time delay unit and the prediction coefficient w(n) from the coefficient generator 53 to input the generated signal to the subtractor 21.

The configuration and action of the interference cancellation method and device of the ICS repeater using the leveler according to the embodiment of the present disclosure as described above are described in detail with reference to FIGS. 3 to 5.

Firstly, since in designing the ICS repeater that may be used in a wireless network, the present disclosure uses a leveler that converts time axis data into frequency axis data by FFT of the reference signal x(n) in the ICS engine for interference cancellation, only interference signals by narrowband input signal sources are effectively cancelled.

FIG. 3 is a schematic diagram of the device for cancelling the interference signal of the ICS repeater using the leveler according to the embodiment of the present disclosure and the ICS repeater includes is configured to predict a signal y'(n) fed back from the ICS engine 50 in order to cancel the interference signal fed back from the transmission antenna 30 to the reception antenna 10, cancel it from an input original signal d(n) by using the subtarctor 21, and then output to the transmission antenna 30 through the amplifier 22.

Figure 4:
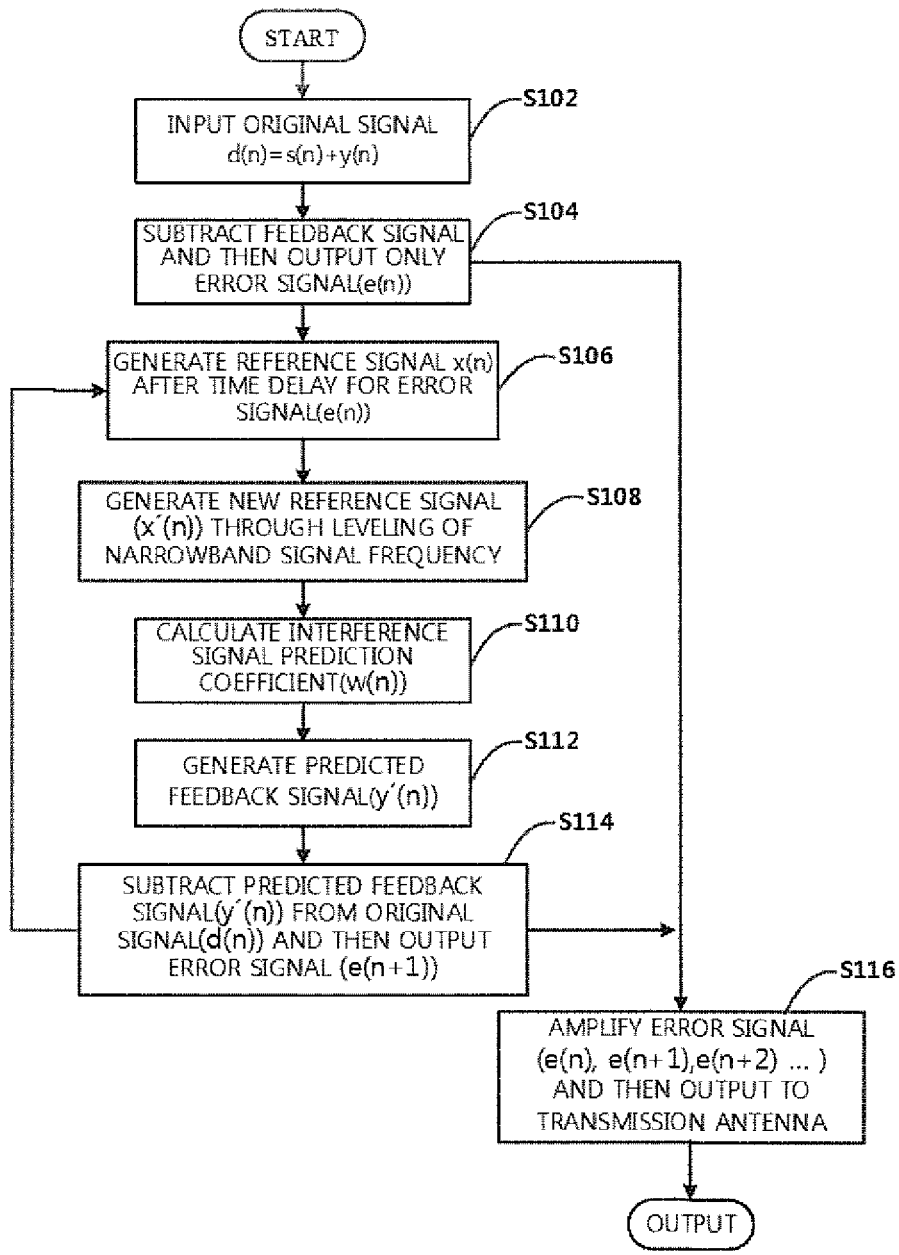
FIG. 4 is a flow chart of an interference cancellation process of an ICS repeater using a leveler according to an embodiment of the present disclosure.

FIG. 4 is a flowchart of an interference signal cancellation process of the ICS repeater using the leveler according to the embodiment of the present disclosure and firstly, a feedback signal y(n) included in the original signal d(n) that is transmitted from the reception antenna 10 to the transmission antenna 30 is subtracted and an error signal e(n) devoid of the interference signal is output to the transmission antenna 30 through the amplifier 22 in steps S102, S104, and S116.

In this case, the error signal e(n) is input to the ICS engine 50 to calculate the predicted feedback signal y'(n) and then the calculated signal is input to the subtractor 21. The process of calculating the predicted feedback signal y'(n) through units 51 to 54 that the ICS engine 50 includes is described below in more detail.

The time delay unit 51 delays the error signal e(n) output from the subtractor 21 for a certain time to generate a reference signal x(n) in step S106.

The leveler 52 receiving the reference signal x(n) generated from the time delay unit 51 levels the characteristics of narrowband signals to generate a new reference signal x'(n) in step S108.

That is, the leveler converts a narrowband frequency axis signal, the characteristic of a narrowband signal into a wide signal, and to this end, time axis data is firstly converted into frequency axis data by FFT of the reference signal x(n), and the converted frequency axis data is leveled and then restored to time axis data through IFFT to calculate a new reference signal x'(n).

Figure 5:
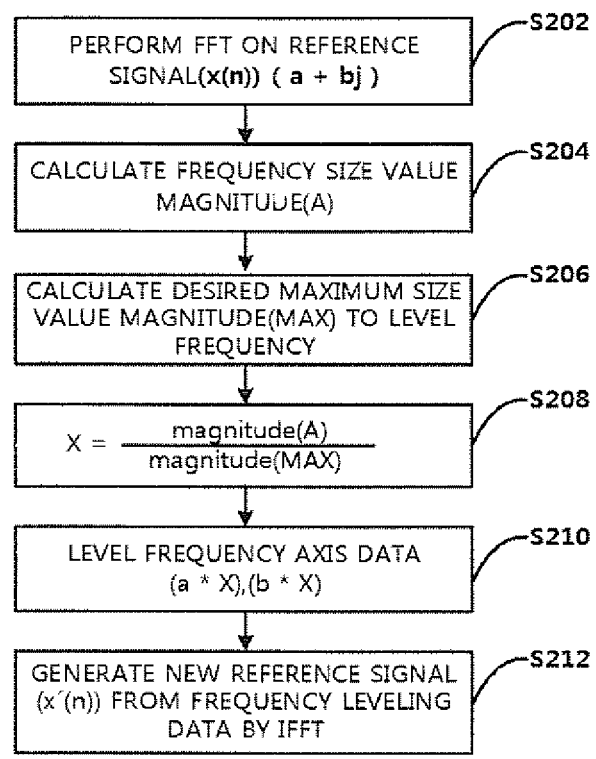
FIG. 5 is a flowchart of a leveling process of calculating a new reference signal x'(n) in FIG. 4.

FIG. 5 is a flowchart of the calculation process of the new reference signal x'(n) by the leveler 52 in FIG. 4 and descriptions are provided in more detail with reference to FIG. 5.

Firstly, time axis data is converted into frequency axis data through the FFT process of a reference signal x(n) from the time delay unit 51 in step S202.

The frequency axis data, a result value of the FFT is expressed by a complex number a+bj and in this example, the size magnitude(A) and phase of a frequency by the complex number are calculated by Equation 1 below in step S204:

$$\text{magnitude}(A) = \sqrt{a^2 + b^2}$$ ⟨Equation 1⟩
$$\text{phase} = a\tan\frac{b}{a}$$

The desired size value Magnitude(MAX) to be leveled is set and for example, in the case of a 14-bit (8191 to −8192) data system, the desired size Magnitude(MAX) is set to the value as calculated by Equation 2 below in step S206:

$$\text{Magnitude(MAX)} = \sqrt{(-8912)^2 + (-8912)^2}$$ ⟨Equation 2⟩

The ratio X of the desired size value Magnitude(MAX) to be leveled to the size magnitude(A) as calculated in Equation 1 above to the desired size value Magnitude(MAX) to be leveled as in Equation 2 is calculated by Equation 3 below in step S208:

$$\text{Magnitude(MAX)} = \text{Magnitude}(A) \times X$$
$$X = \frac{\text{Magnitude(MAX)}}{\text{Magnitude}(A)}$$

The ratio X calculated through the above processes is multiplied (a*X), (b*X) by the 'a' and the 'b' of the complex number a+bj to perform leveling in step S210.

Since the leveled frequency axis data is restored back to the time axis data through an IFFT process, a new reference signal x'(n) is calculated in step S212.

As shown in FIG. 5, the new reference signal x'(n) calculated through the calculation process of the leveler 52 enables the coefficient generator 53 to calculate correlation to the error signal e(n) to calculate an interference signal prediction coefficient w(n) in step S110.

The FIR filter 54 generates an in-phase predicted feedback signal y'(n) by convolution of the interference signal prediction coefficient w(n) input from the coefficient generator 53 and the reference signal x(n) input from the time delay unit 51 and then outputs the generated signal to the subtractor 21 in step S112.

The subtractor 21 subtracts the predicted feedback signal y'(n) from the original signal d(n) to output an error signal e(n+1) devoid of an interference signal in step S114.

The error signal e(n+1) devoid of the interference signal is transmitted to the transmission antenna 30 through the amplifier 22 in step S116.

The error signal e(n+1) devoid of the interference signal is input back to the ICS engine 50, the next-order predicted feedback signal y'(n+1) is generated through the time delay unit 51, the leveler 52, the coefficient generator 53, and the FIR filter 54, the generated signal is output to the subtractor 21, and thus the subtractor 21 outputs an error signal e(n+2) devoid of the predicted feedback signal y'(n+1) included in the original signal d(n+1)=s(n+1)+y(n+1).

Since the ICS engine 50 repeats the above processes, it cancels interference signals included in all original signals d(n) (where n=1, 2, 3, . . . ) input through the reception antenna 10.

The method of cancelling interference of the ICS repeater using the leveler according to the present disclosure has advantages in that it is possible to cancel only interference signals by using the leveler without using a magnetic correlation cancellation device or digital filter in order to cancel unnecessary noise signals generated by narrow-band signals, thus design the ICS repeater for an LTE network that needs a short system delay time (shorter than or equal to 4.6875 μs).

Although the present disclosure is shown and described with particular exemplary embodiments, it is not limited to the above embodiments and various changes and modifications would be implemented by a person skilled in the art to which the present disclosure pertains, without departing from the spirit of the present disclosure.

What is claimed is:

1. An interference cancellation device of an ICS repeater using a leveler that is disposed between a reception antenna and a transmission antenna for a wireless network repeater, subtracts a predicted feedback signal y'(n) from an ICS engine from an original signal d(n) input through the reception antenna, and outputs an error signal e(n) devoid of an interference signal to the transmission antenna side, the interference cancellation device comprising:

a time delay unit configured to delay an error signal e(n) output through the subtractor for a certain time to generate a reference signal x(n);

a leveler configured to level a characteristic of a narrowband signal from the reference signal x(n) output from the time delay unit to generate a new reference signal x'(n);

a coefficient generator configured to calculate correlation between the new reference signal x'(n) output from the leveler and the error signal e(n) to calculate an interference signal prediction coefficient w(n); and a finite impulse response (FIR) filter configured to generate a predicted feedback signal y'(n) by convolution of the reference signal x(n) from the time delay unit and the prediction coefficient w(n) from the coefficient generator to input the generated signal to the subtractor.

2. The interference cancellation device according to claim 1, wherein the leveler is configured to:

convert time axis data into frequency axis data through fast fourier transform (FFT) of the input reference signal x(n), calculate a size value magnitude(A) from a complex number a+bj expressed by a magnitude and phase of a frequency by the FFT, calculate a ratio X of the size value magnitude(A) and a desired maximum size Magnitidude(MAX) to be leveled, and multiply (a*X), (b*X) the calculated X by the 'a' and the 'b' of the complex number a+bj to perform leveling, and restore the leveled data to time axis data through inverse FFT(IFFT) to calculate the new reference signal x'(n).

3. An interference cancellation method of an ICS repeater using a leveler that generates a reference signal x(n) by delaying, through a time delay unit, an error signal e(n) devoid of interference for a certain time between a transmission antenna and a reception antenna and levels the reference signal through the leveler to cancel an interference signal generated by a narrowband input signal source, the interference cancellation method comprising:

leveling, through a leveler, a characteristic of a narrowband signal from a reference signal x(n) generated from a time delay unit to generate a new reference signal x'(n);

calculating correlation between the new reference signal x'(n) through the leveler and an error signal e(n) through a subtractor to calculate an interference signal prediction coefficient w(n); and generating a predicted feedback signal y'(n) from the reference signal x(n) and the prediction coefficient w(n); and subtracting the predicted feedback signal y'(n) by the subtractor to output an error signal e(n+1) devoid of an interference signal.

4. The interference cancellation method according to claim 3, wherein the leveling comprises:

converting, by the leveler, time axis data into frequency axis data through FFT of the input reference signal x(n), calculating a size value magnitude(A) from a complex number a+bj expressed by a magnitude and phase of a frequency by the FFT;

calculating a ratio X of the size value magnitude(A) and a desired maximum size Magnitidude(MAX) to be leveled;

multiplying (a*X), (b*X) the calculated X by the 'a' and the 'b' of the complex number to perform leveling; and restoring the leveled data to time axis data through IFFT to calculate the new reference signal x'(n).

5. The interference cancellation method according to claim 4, wherein the size value magnitude(A) is calculated by the following Equation:

$$\text{magnitude}(A) = \sqrt{a^2 + b^2}.$$

6. The interference cancellation method according to claim 4, wherein the ratio X is calculated by the following Equations:

$$\text{Magnitude}(MAX) = \text{Magnitude}(A) \times X$$

$$X = \frac{\text{Magnitude}(MAX)}{\text{Magnitude}(A)}.$$

7. The interference cancellation method according to claim 3, wherein the interference signal prediction coefficient w(n) is performed by a coefficient generator that performs an adaptive algorithm.

8. The interference cancellation method according to claim 3, wherein the generating of the predicted feedback signal y'(n) is performed by an FIR filter that generates the predicted feedback signal y'(n) by convolution of the reference signal x(n) and the prediction coefficient w(n).

* * * * *